(12) United States Patent
Brophy, III et al.

(10) Patent No.: US 7,198,303 B2
(45) Date of Patent: Apr. 3, 2007

(54) EXHAUST PIPE JOINT AND SEAL

(75) Inventors: Lawrence John Brophy, III, Franklin Park, NJ (US); Kurry Brian Emmons, Neshanic Station, NJ (US)

(73) Assignee: Metex Mfg. Corporation, Edison, NJ (US)

( * ) Notice: Subject to any disclaimer, the term of this patent is extended or adjusted under 35 U.S.C. 154(b) by 0 days.

(21) Appl. No.: 10/403,425

(22) Filed: Mar. 31, 2003

(65) Prior Publication Data

US 2005/0258642 A1    Nov. 24, 2005

(51) Int. Cl.
F16L 27/04    (2006.01)

(52) U.S. Cl. .................. 285/267; 285/271; 277/609; 277/614; 277/616

(58) Field of Classification Search .............. 285/223, 285/268, 910, 271, 267, 266, 261, 263, 414, 285/234, 368, 379, 334.1; 277/609, 614, 277/616
See application file for complete search history.

(56) References Cited

U.S. PATENT DOCUMENTS

| | | | |
|---|---|---|---|
| 284,146 A | 8/1883 | Russell et al. | |
| 305,140 A | 9/1884 | Bradley | |
| 337,867 A | 3/1886 | Richards | |
| 437,915 A | 10/1890 | Costigan | |
| 526,097 A | 9/1894 | Anderson | |
| 649,476 A | 5/1900 | Prouty | |
| 796,084 A | 8/1905 | Orr | |
| 1,080,674 A | 12/1913 | Berg | |
| 1,282,681 A | 10/1918 | Faribault | |
| 1,307,273 A | 6/1919 | Salley | |
| 2,131,509 A | * 9/1938 | Donahue et al. | ......... 285/334.1 |
| 3,248,133 A | 4/1966 | Michnoff | |
| 4,708,370 A | 11/1987 | Todd | |
| 5,040,805 A | 8/1991 | Ozora | |
| 5,340,952 A | 8/1994 | Takiguchi | |
| 5,683,119 A | 11/1997 | Emmons et al. | |
| 5,784,750 A | 7/1998 | Sankovic et al. | |
| 6,312,022 B1 | 11/2001 | Brophy, III et al. | |

FOREIGN PATENT DOCUMENTS

GB    0005475    4/2000

* cited by examiner

Primary Examiner—Aaron Dunwoody
(74) Attorney, Agent, or Firm—Carella Byrne Bain et al.; John G. Gilfillan, III; William Squire

(57) ABSTRACT

Compressed wire filament(s) form a seal that seals the joint between first and second pipes of an automotive exhaust system secured by bolted together first and second flanges. The seal is initially attached to the first pipe and first flange in an intermediate assembly by an interface connection that prevents the seal from axially moving off of the first pipe prior to final assembly to the second pipe and second flange. A male projection is at the end region of the first pipe outer surface to which the seal is attached. The first flange abuts the seal at a planar seal interface. The seal has a bore with a longitudinal channel portion for initially axially engaging the projection and a transverse channel portion medially the seal bore for receiving the projection by rotation of the seal after the projection is axially displaced within the seal bore. The transverse channel portion may be tapered to wedge the projection in place to preclude accidental disengagement of the seal prior to final assembly to the mating second flange and second pipe. The joint in one embodiment articulates and in a second embodiment the joint is fixed and does not articulate. Various embodiments are disclosed.

38 Claims, 7 Drawing Sheets

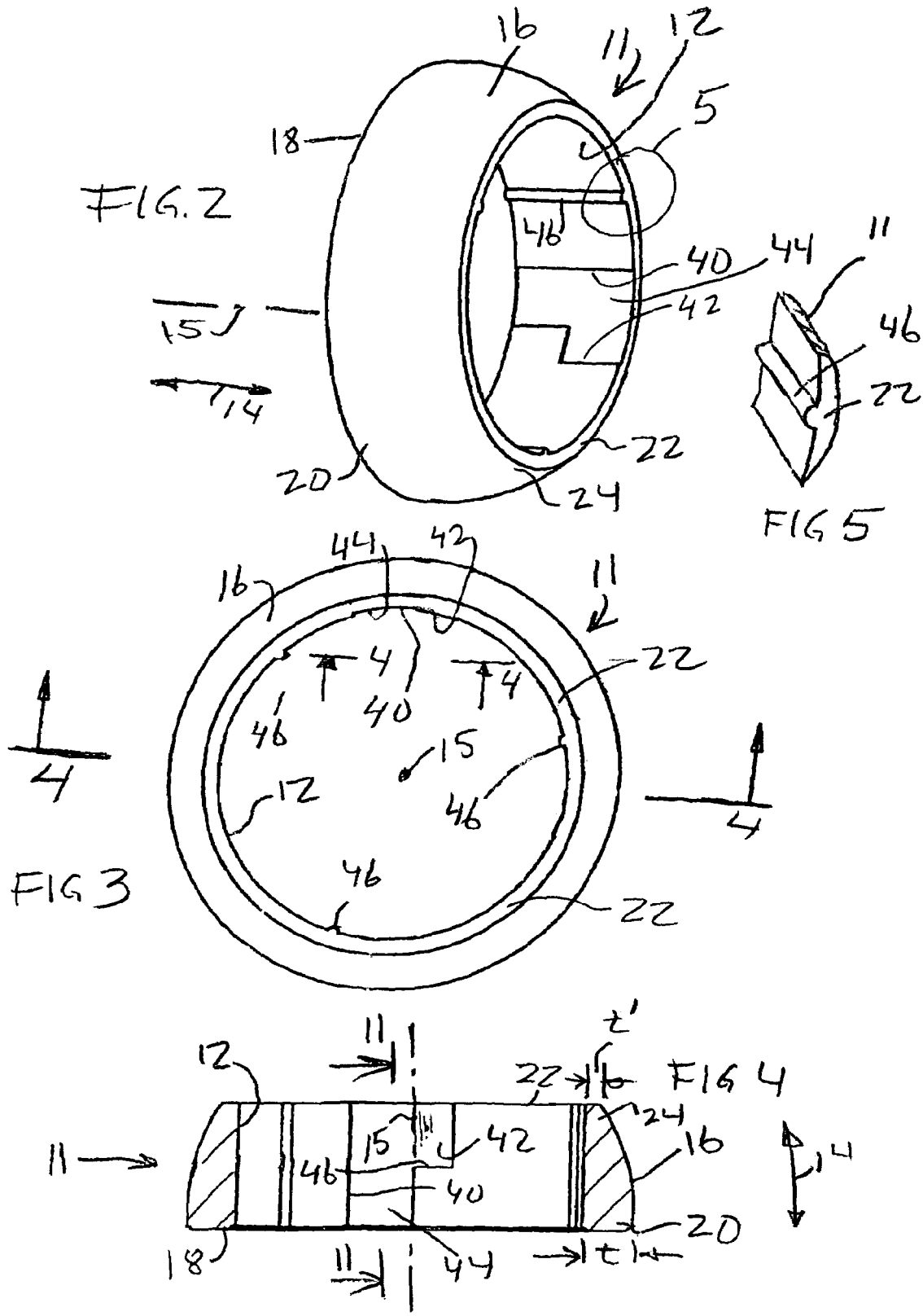

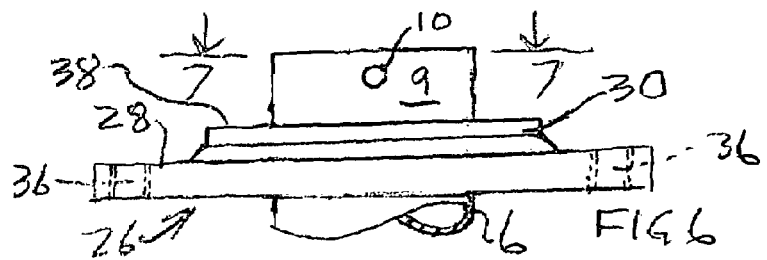
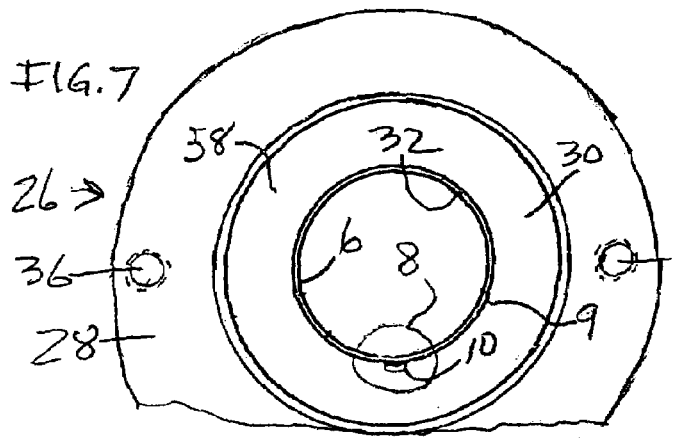
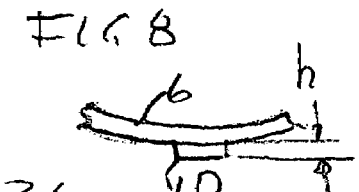
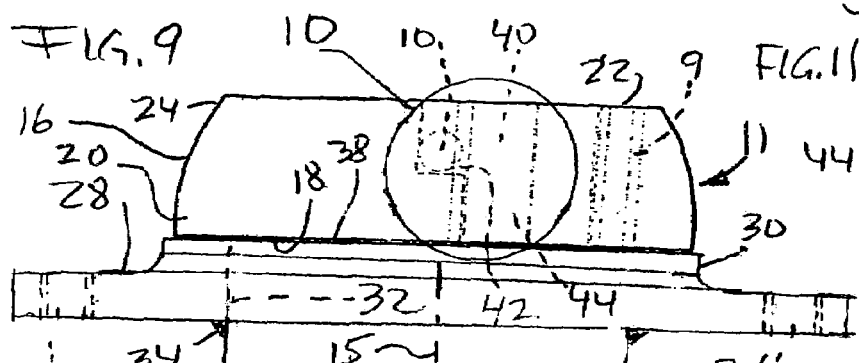
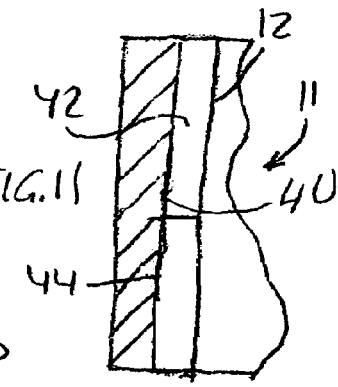
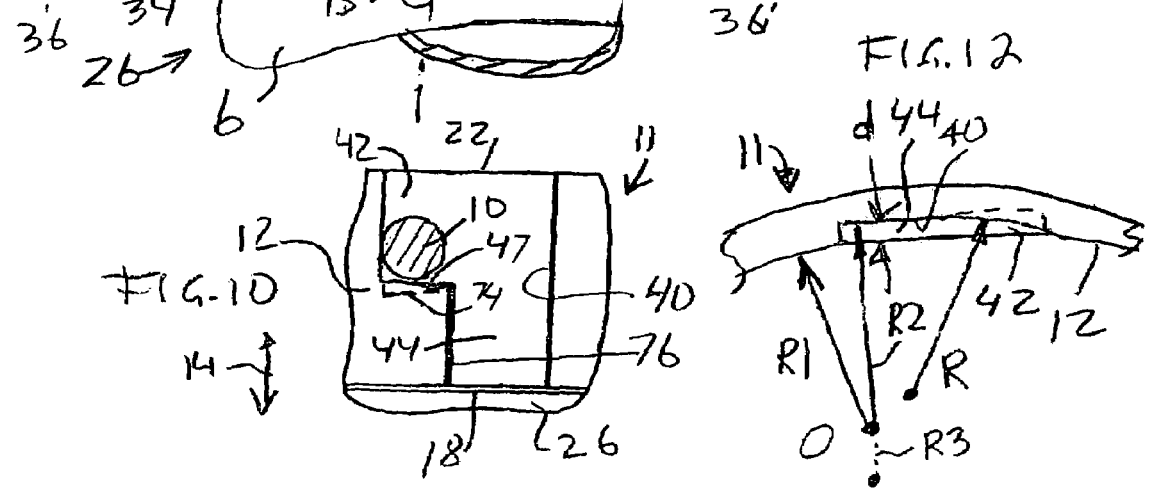

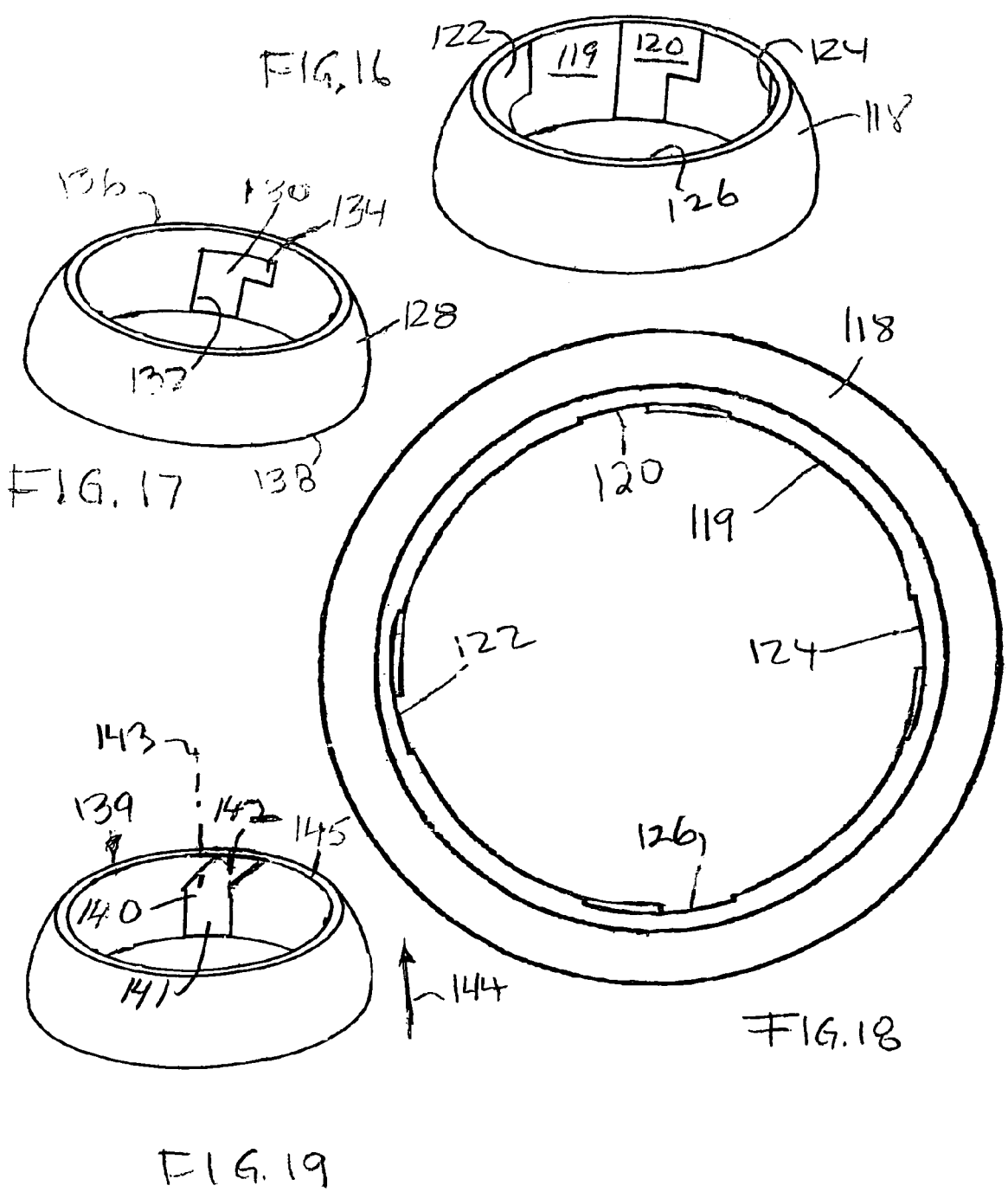

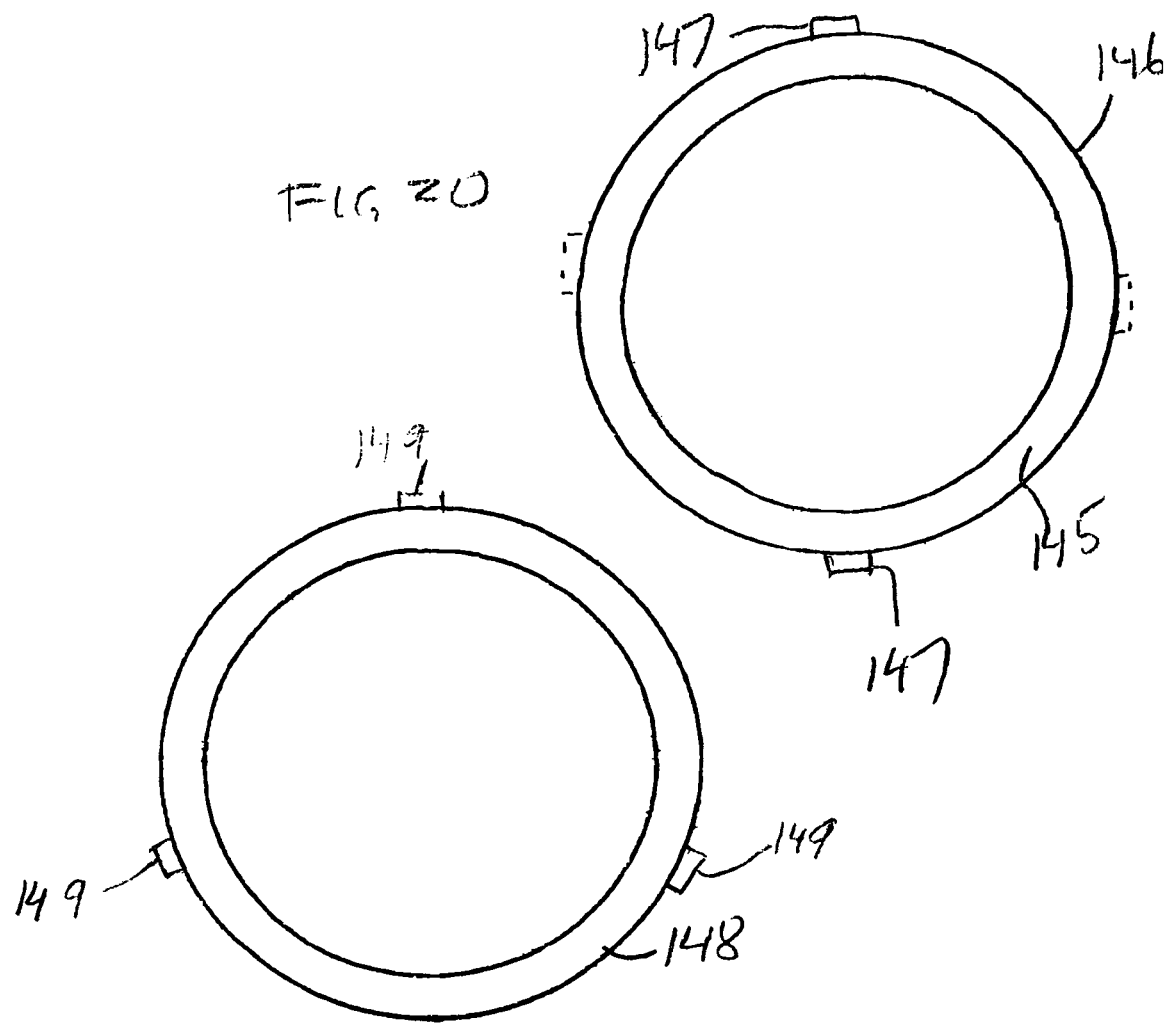

EXHAUST PIPE JOINT AND SEAL

This invention relates to spherical seals employed in pipe joints for automotive exhaust systems, such joints being articulating or rigid.

Of interest are commonly owned U.S. Pat. Nos. 5,683,119; 6,025,018 and 6,312,022, all incorporated by reference herein in their entirety.

Pipe joints for certain automotive exhaust systems employ seals with spherical surfaces in articulating or fixed joints. In one of these joints, one exhaust pipe is interconnected to a second exhaust pipe for relative rotation thereto. The joint employs a seal with a convex surface for sealing the joint with respect to hot toxic exhaust gases as the pipes are articulated in use. A fixed joint is disclosed in commonly owned U.S. Pat. No. 6,312,022. Prior art joints and seals are disclosed in U.S. Pat. Nos. 5,499,825 and 5,040,805, and the above noted commonly owned patents, all incorporated in their entirety by reference herein.

Typical exhaust joints comprise a seal, usually formed into a preform of a wire mesh and filler material, and then crushed by dies to the end seal shape as illustrated in the aforementioned patents. The seals may be rigid or compliant in accordance with the seal construction. A lubricant or lubricating material is incorporated in the seal to provide a lubricating surface. These seals are exposed to relatively high temperature exhaust gases and for safety purposes, can not leak during use due to the toxic nature of such gases in an automotive environment.

The seals are annular with a radially outer convex spherical segment sealing surface and opposing planar end surfaces as shown in U.S. Pat. No. 5,499,825. In this patent, the seal, formed of crushed wires, has a circular cylindrical through bore which communicates with the planar end surfaces for receiving a pipe concentric with the spherical annular surface. A flange is welded in fixed position to the received pipe spaced from the pipe end edge and has a planar surface abutting one of the seal planar surfaces. This planar surface interface forms a second seal surface. The seal bore surface in engagement with the mating pipe outer surface is not gas tight. The flange fixes the axial position of the seal and forms a gas tight joint with the seal mating surface. The seal spherical surface terminates adjacent to the flange. The other opposite end planar surface of the seal terminates approximately flush with the pipe end edge. The seal has an annular bore surface that abuts the pipe outer circumference and a circular disc-like plane surface normal to the bore abutting a flange that forms one sealed gas tight interface. The spherical surface of the seal mates with a concave spherical surface of a second flange secured to a second pipe. These mating spherical surfaces forms a second gas tight interface. The joints between the flanges and the pipes is welded so that the only leakage path possible is via the gas tight spherical seal and one flange mating surface and the gas tight planar mating surfaces of the second flange and seal. Leakage is precluded at the seal interface with the pipe because of the weld to that pipe of the corresponding flange.

The integrity of these mating gas tight seal surfaces is important to provide the needed sealing action with the mating flange surfaces. The seal is mounted on the pipe adjacent to the flange in an interim assembly procedure. While so assembled the seal may fall off of the pipe prior to being fixed in place by the second movable flange attached to a second pipe with the spherical concave flange surface. This premature falling off of the seal presents a problem solved by the present invention.

In one kind of seal, which forms an articulated joint, the second movable flange has a concave surface mating with the seal convex surface to form a dynamic engagement therewith. The two flanges each have a pair of aligned apertured flange members. A bolt is screwed to the flange members of the fixed flange. A compression spring is between each flange member of the movable flange and captured to a corresponding bolt by a bolt head. The springs resiliently urge the dynamic flange concave surface into resilient movable gas tight engagement with the seal convex surface.

A second pipe is secured to the dynamic flange. The second pipe resiliently rotates relative to the first pipe about the engaged spherical surfaces. A similar joint is illustrated in U.S. Pat. No. 5,040,805. The purpose of these joints is to provide a relatively fluid tight seal for the toxic exhaust gases flowing through the pipes at the joint while permitting the pipes to move relative to one another.

In a second type of seal, the joint between the pipes is fixed and does not articulate as illustrated in the above noted U.S. Pat. No. 6,312,022. The mating surfaces of the seal to the flanges are spherical, but at different radii to provide pressure line contact between the mating spherical surfaces instead of area contact. This line contact between the mating spherical surfaces provides stress concentration which enhances the gas tight sealing action. Both of these type of joints exhibit the problem discussed above wherein the seals tend to fall off of the one pipe to which the seal is mounted prior to the mounting of the second pipe and corresponding flange.

The present inventors recognize the above noted problem with these joints during the assembly process in an automotive assembly line. In the assembly line process, there are a number of applications where the seals need to be installed on the exhaust manifold of an engine long before the seals are mated to the remainder of the exhaust system, i.e., the second pipe and the second flange. In many of these applications, the engine and seal are subjected to bumps, turns, operations, and elevation changes. Each of these instances creates a possibility for the seal to fall off of the first pipe or flange attached to the engine manifold prior to its attachment to remainder of the exhaust system, and in particular, to the second flange and pipe associated therewith as noted above.

The difficulty in creating a robust design that precludes such a problem lies in the fact that there is inherent tolerance variation in the mating components. A typical exhaust pipe outer diameter (OD) can vary as much as +/−0.5 mm or a total of 1 mm between low and high values. Therefore, a seal produced to fit snug onto a large OD pipe is sufficiently loose on a small OD pipe so as to possibly fall off during the assembly procedure. Conversely, if the seal is made to fit snug onto a small OD pipe, it will not fit onto a large pipe.

To overcome this problem, typical present technology utilizes ribs on the internal diameter (ID) of the seal or cordial flats (flat surfaces extending in a chord direction of the ID). These features are sized such that they will allow for a snug fit on a small pipe, and will collapse during installation onto a large OD pipe. This technique is limited by the amount of force it takes to install the seal. In order to maintain a tight fit on a small OD pipe, the, flats/ribs need to be somewhat large, and, therefore, are difficult to force over a large OD pipe.

Today, in view of operator safety, ergonomics, and unions, many assembly lines have limits on the amount of "pushing" forces the workers are allowed to exert. Some seals employing the ribs and flats have been noted to exhibit as much as double the allowable assembly line permitted manual pushing force value needed to install the seal on the mating pipe in many assembly line plants.

While the prior art is replete with interconnections of pipes to each other, the problem is not so much as interconnecting a pipe to another pipe, but how to couple the seal to one of the pipes before the pipes are interconnected while still maintaining the integrity of the seal surfaces to maintain a fluid tight seal at the joint. For example, the above noted patents directed to interconnection of pipes and seals exhibit the assembly line problem of seals falling off one of the pipes prior to assembly to the second pipe. They also exhibit the excessive non-allowable force fit of the seals to one of the pipes prior to attaching the second pipe thereto. Another problem noted by the present inventors is that in use, vibrations tend to rotate the seals relative to the joint, causing wear of the seal such as at the ribs, when used, and such wear introduces leakage in the joint.

Numerous other pipe interconnections, in addition to those noted above, are obviously used in non-exhaust systems, but do not employ such seals. Therefore, such interconnections do not exhibit the problem with pipe interconnections requiring seals as described. Examples of such interconnections are shown for example in U.S. Pat. No. as follows: U.S. Pat. No. 437,915, showing a pipe joint, U.S. Pat. No. 649,476, illustrating a hydraulic coupling, U.S. Pat. No. 3,248,133, showing a hose connected to the exhaust pipe of an automobile for defrosting the automobile windows with the hot exhaust gases, leakage at the coupling not being a problem as it is in a harmless location, U.S. Pat. No. 4,708,370, illustrating a coupling of a drain pipe to a recreational vehicle discharge pipe, U.S. Pat. No. 5,340,952 showing an exhaust muffler interconnection not employing a seal as described above herein, and U.S. Pat. No. 5,784,750 illustrating a multi-component flow passage assembly with a snap-in sealing adaptor for use in a vacuum cleaner horn. However, such connections are not typically employed for interconnecting exhaust pipes with or without articulating joints with an intermediate seal in the joint as described in U.S. Pat. Nos. 5,683,119; 5,499,825; 5,040,805; 6,025,018 and 6,312,022.

Another problem of the prior art seals as disclosed in the aforementioned patents directed to exhaust seals is that such seals also tend to rotate in the final assembly configuration in the exhaust system during use of the vehicles with such exhaust systems. This rotation occurs due to vibration and other forces on the seal. This rotation causes premature wear and failure of the seals requiring costly frequent replacement as well as undesirable toxic gas leakage during use. Those seals that use axial ribs to assist in the assembly exhibit rapid wear of the ribs and eventually loose fit of the seals in the joint. This is undesirable.

A seal construction according to the present invention is for an automotive exhaust system joint defining an interface, the joint including first and second exhaust pipes each having an outer cylindrical surface, the joint further including first and second flanges attached to the respective pipes for interconnecting the pipes at the joint in a final assembly, at least the first flange having an outer cylindrical surface, one of the first flange outer cylindrical surface and first or second pipe outer cylindrical surface forming a first interface connection.

The seal construction comprises an annular seal with a cylindrical bore and formed of at least one heat resistant filament for location in the interface for sealing the joint at the interface so that fluid flows between the pipes with negligible exhaust leakage. The seal has a second interface connection in the bore and configured to be connected to the first interface connection, the first and second interface connections are arranged to preclude relative rotation of the seal to the flanges and pipes and to minimize vibratory disengagement of the seal from the one pipe or flange in an intermediate assembly stage prior to final assembly of the pipes and flanges forming the joint.

In one aspect, the seal has an outer surface and the bore is circular cylindrical having a first surface defining a longitudinal axis, the first surface having the second interface connection, the first surface for mating with and receiving the one of the first flange outer cylindrical surface or first or second pipe outer cylindrical surface.

In a further aspect, the first interface connection comprises a projection extending radially outwardly from the one of the first flange outer cylindrical surface or first or second pipe outer cylindrical surface, the bore having opposing ends and a first surface, the second interface connection comprising a channel defined by first and second portions in the bore first surface, the first channel portion extending in an axial direction along an axis and in communication with at least the bore first end and a second channel portion in communication with the first channel portion in a region at least medially the first and second ends and extending in a direction transverse to the first channel portion axial direction, the first and second channel portions for sequentially receiving the projection for axially and rotationally securing the seal to the one flange, to the first pipe or to the second pipe with the projection.

In a further aspect, the second channel portion extends in a circumferential direction that is normal to the first channel portion.

In a further aspect, the first flange is the one flange and is secured to the first pipe and abutting the seal at the seal first end and the second flange is movably secured to the first flange and abutting the spherical surface, the second flange being arranged to receive the second pipe.

In a further aspect, the first flange is the one flange and is secured to the first pipe and abutting the seal at the seal first end and the second flange is fixedly secured to the first flange and to the spherical surface, the second flange being arranged to receive the second pipe.

In a further aspect, the first channel portion is defined by a second surface recessed into the first surface, the second channel portion defined by a recessed third surface that tapers from the second surface toward the first surface.

In a still further aspect, the tapering third surface merges with the first surface and second surface.

In a further aspect, the seal further includes a first flange secured to the first pipe and abuts the seal at the seal first end and further including a second flange movably secured to the first flange and abutting the spherical surface, the second flange being arranged to receive the second pipe.

In a further aspect, the first channel portion is defined by a second surface recessed into the first surface, the second channel portion defined by a third surface recessed from the first surface, the second and third recesses being defined by radii having a common origin.

In a still further aspect, the first channel portion is defined by a second surface recessed into the first surface, the second channel portion defined by a third surface recessed from the first surface, the second and third recesses defined by radii having different origins.

In a further aspect, the first channel portion is defined by a second surface recessed into the first surface, the second channel portion defined by a third surface recessed from the first surface, the third surface being inclined relative to the first and second surfaces.

In a further aspect, the third surface merges gradually with the first and second surfaces to form a smooth transition therebetween.

In a further aspect, the first, second and third surfaces are defined by radii having the same origin.

In a still further aspect, the at least one filament comprises steel wire. Preferably, the at least one filament comprises compressed steel wires. More preferably, the at least one filament is compressed knitted steel wires.

In a further aspect, the projection extends radially outwardly from the one pipe or one flange outer peripheral surface a distance less than the depth of at least the first channel portion.

In a further aspect, the seal further includes a plurality of axially extending spaced ribs extending radially inwardly from the bore first surface dimensioned to frictionally engage the first pipe.

A seal according to a still further aspect of the present invention comprises an automotive hot gas exhaust seal construction comprising a first exhaust pipe having first and second opposite end edges and a first flange attached to the first cylindrical exhaust pipe, one of the first flange and first pipe having an outer cylindrical surface including at least one projection extending radially outwardly therefrom.

The construction includes an annular exhaust gas seal member formed of at least one compressed wire filament, the annular seal member having an outer surface and a circular cylindrical bore with a first surface defining a longitudinal axis, the first surface being engaged with one of the first exhaust pipe and first flange outer cylindrical surface, the cylindrical bore terminating at first and second opposing member ends, the first surface having an axially extending first channel portion, the first channel portion terminating at the first end and terminating at a region that is at least medially the first and second bore ends, the first surface having a second channel portion extending transverse to and in communication with the first channel portion, the first and second channel portions for receiving the at least one projection, the at least one projection engaged with the second channel portion in an engaged seated position of the seal.

A second flange abuts the member outer surface and is attached to the first flange for forming a seal joint with the first flange and member, the second flange for receiving a second pipe.

The construction may form an articulating joint or a fixed joint wherein the first and second flanges may be movable relative to each other in one embodiment and fixed relative to each other in a second embodiment. In the second embodiment the flanges may be fixed to each other by bolts for example and the second flange may be fixed to the seal convex surface, by welding for example.

In a further aspect, a seal joint construction for an automotive exhaust system comprises first and second exhaust pipes having outer cylindrical surfaces. First and second flanges are attached to the respective first and second pipes for interconnecting the pipes and arranged to form a joint final assembly, at least the first flange having an outer cylindrical surface, a pair of surfaces of the pipes and flanges forming an interface. A seal is in the interface for sealing the joint so that fluid flows between the pipes with negligible exhaust leakage. A connection between the seal and the outer cylindrical surface of one of the pipes and first flange at the interface is arranged to preclude relative rotation of the seal to the flanges and pipes and to minimize vibratory disengagement of the seal from the one pipe or first flange in an intermediate assembly of the seal to the one pipe or flange prior to the final assembly.

IN THE DRAWING

FIG. 2 is an isometric view of a seal according to an embodiment of the present invention;

FIG. 3 is a top plan view of the seal of FIG. 2;

FIG. 4 is a side elevation sectional view of the seal of FIG. 3 taken at lines 4—4;

FIG. 5 is an isometric view of a portion of the seal of FIG. 2 taken at region 5;

FIG. 6 is a side elevation view of a flange and pipe portion used in the embodiment of FIG. 1

FIG. 7 is a top plan view of a fragment of the flange and pipe portion of FIG. 6;

FIG. 8 is a more detailed view of a section of the pipe portion of FIG. 6 taken at region 8;

FIG. 9 is a side elevation view of an assembly of the flange and pipe portion of FIG. 6 with a seal according to an embodiment of the invention attached;

FIG. 10 is a more detailed view of the interface section view between the pipe portion of FIG. 9 and the seal showing the pipe projection seated in a channel in the seal to axially retain the seal on the pipe;

FIG. 11 is a sectional elevation view of the seal of FIG. 4 taken at lines 11—11;

FIG. 12 is a fragmented top plan view of a portion of seal showing a more detailed view of the projection receiving channels;

FIGS. 16 and 18 are isometric and top plan views of a seal according to a further embodiment of the present invention;

FIG. 17 is an isometric view of a seal according to a further embodiment;

FIG. 19 is an isometric view of a seal according to a further embodiment;

FIGS. 20 and 21 are plan views of a seal according to still further embodiments of the present invention.

Figure 1:
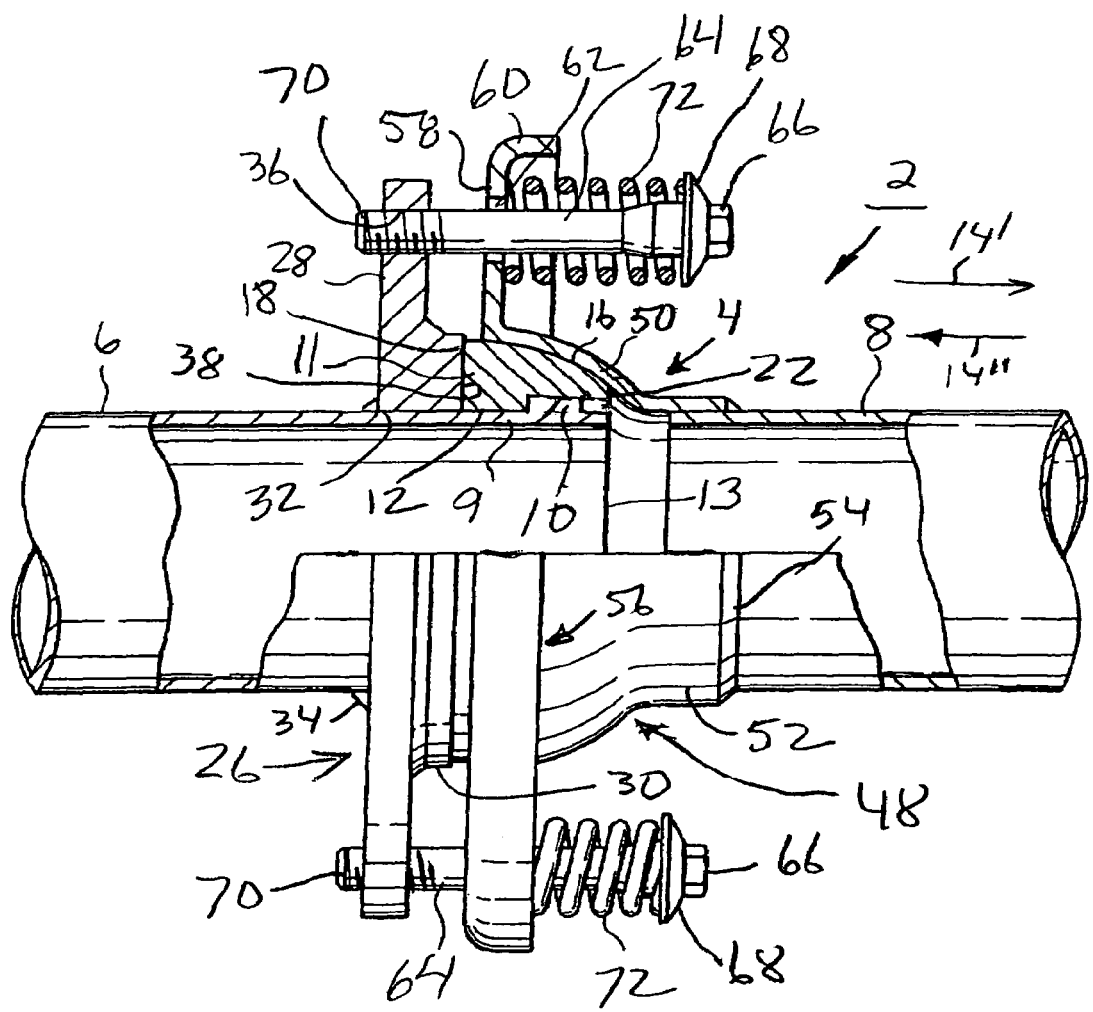
FIG. 1 is a side elevation sectional view, partially in section, of an exhaust joint and seal according to the present invention.

FIG. 1, seal joint assembly 2 is particularly adapted for use with automotive exhaust systems employing articulating exhaust pipes, but may also be used with non-articulating joints. The assembly may be employed in other fluid distribution systems in which it is desired that one pipe be relatively movable with respect to a second pipe in fluid tight sealed relation. The assembly 2 comprises a seal joint 4 for sealingly attaching a circular cylindrical, preferably stainless steel, pipe 6 to a second circular cylindrical, preferably stainless steel, pipe 8, with an intermediate seal 11. Seal 11 provides a fluid tight joint at the interface with and between the pipes. Pipes 6 and 8 are generally conventional for use in automotive exhaust systems for conveying hot toxic combustion engine exhaust gases, with one exception in that pipe 6 has a projection 10 on one interface surface of the joint.

Projection 10 is generally circular cylindrical, although it may be other shapes. The projection 10 extends radially outwardly from the outer peripheral. surface of pipe 6 at pipe portion 9 adjacent to and spaced from the pipe edge 13. The projection forms a first interface connection. Except for the projection 10, the pipe 6 is conventional.

In such exhaust systems, the joint must be essentially leak proof while permitting one pipe, in an articulating joint to rotate with three degrees of rotational freedom and no translation relative to the other. When automobiles, for example, are stationary, leaking exhaust gases may undesirably seep into the vehicle passenger cabin. If the joint is prior to the catalytic converter, untreated exhaust gas may escape. Under certain operating conditions, air can be drawn into the joint by a lower pressure within the joint.

In sophisticated systems, an oxygen sensor senses the oxygen content of the exhaust gas in the exhaust pipes. If air is drawn into the joint via a leak, the sensor may sense an erroneous lean condition. A computer in response may cause a richer mixture of fuel-air to be supplied to the engine, resulting in higher undesirable emissions and poorer fuel economy. The joint and seal of the present invention minimizes such leaks.

In addition, as noted in the introductory portion, the seal, such as seal 11, is typically attached to the pipe 6 adjacent to the edge 13. Due to dimensional variations in the pipe OD and seal ID dimensions of the prior art seals such as disclosed in U.S. Pat. Nos. 6,312,022, 5,683,119 and 5,499,825, the seal may be too difficult to be manually pushed onto the pipe 6 or it may be too loose and fall off of the pipe 6 in an intermediate assembly, or equivalent structures in the prior art, prior to the remainder of the joint being assembled to the pipe 6 in an automotive assembly line to form the final assembly.

The seal 11 according to an embodiment of the present invention is preferably formed with a reinforcing matrix of one or more wire filaments, such as a knitted wire mesh, which may be formed of stainless steel wires, and comprising wire of a diameter determined by a given implementation, a filler material which may be vermiculite or mica and a lubricant such as graphite. These materials may be combined according to a given implementation and may form a preform during a stage of fabrication of the seal. Examples of such preform materials are disclosed in the aforementioned U.S. Pat. Nos. 5,499,825 and 5,040,805, incorporated by reference herein. Also, disclosed in these patents are techniques for forming preforms for use in an automotive exhaust joint arrangement using seals of the type disclosed therein.

The resulting preform, generally planar, is flexible and wrapped about a mandrel to form a cylindrical structure as shown for example in U.S. Pat. Nos. 5,499,825 and 5,040,805. For example, in U.S. Pat. No. 5,499,825, a knitted wire net of stainless steel fine wire is combined with a sheet of heat resistant material such as expanded graphite, mica or asbestos. A lubricating composition is then coated on the sheet material which is placed within the knitted wire mesh. This structure is then wrapped about a mandrel in a female die of cylindrical shape. A male cylindrical die is inserted into the female die compressing the preform material in the female die, forming the preform into the desired seal configuration.

Other forms of the composite material may include powder matrices added to the female die after the wire mesh is wrapped about a core in the female die. This powder matrix material tends to be external to the wire mesh in the formed seal. The combination of materials is then compressed with a male die to form the seal.

In U.S. Pat. No. 5,040,805, a knitted wire mesh is wound about a core. An expanded graphite sheet is disposed over the uncoiled wire mesh. Both are wound cylindrically in succession on a partial cylindrical part and a preform body with a refractory material projecting on an end portion of the preform body is formed.

Depending upon the filament or wire mesh parameters, e.g., wire size and knit loop spacing, and the filler material, the resulting seal can be compliant or relatively rigid.

In one form, the lubricant may be a graphite sheet material wrapped about the wire mesh preform. In a further embodiment, a powder composite, a lubricating material such as graphite and the wire mesh are placed in the female die. When compressed, the resultant structure is relatively hard and rigid. The lubricating material is placed to form a lubricating surface on the seal for dynamic action with a mating flange surface. While generally the seal is fabricated from a plurality of filaments such as knitted wires, it may in certain instances be fabricated from a single filament that is configured for compression between dies to form the final seal shape. The single filament may be wound about a mandrel until it is sufficiently thick to form the seal or may be coiled into random loops and so on for later compression.

The seal 11, FIGS. 2–4, is circular with a circular cylindrical through bore 12 defining longitudinal axis 15 extending in axial direction 14. The seal 11 has a convex spherical outer peripheral surface 16. The convex spherical surface 16 is annular and encompasses the bore 12 in juxtaposed spaced relation on one side of the seal 11. The seal 11 has a planar face surface 18 at end 20 and a second planar end face surface 22 at end 24. The seal 11 at end 20 has a thickness t greater than the thickness t' at end 24. End 24 is adjacent to the pipe 6 edge 13, FIG. 1.

The surface 16 slopes inclined relative to the bore cylindrical inner annular surface 12 and axis 15 about which surface 12 is concentric. The angle of inclination is such that surface 16 preferably forms a tapered wedge-like configuration in section as shown in FIGS. 1 and 4, at end surface 22 relative to the bore surface 12. However, the convex surface may be formed into other configurations. Both end surfaces 18 and 22 are planar and normal to the axis 15. The surface 16 is for dynamic engagement and is spherical to permit rotational action with the mating flange in one embodiment or may be fixed to the mating flange in a second embodiment, described below.

The seal 11 bore 12 has a first surface that terminates at the ends 18 and 22. Formed into the surface of bore 12 is a second interface connection which mates with the first interface connection and comprises a channel 40, FIGS. 2–4, 10, 11 and 12. Channel 40 is recessed into the bore 12 surface and formed into two portions 42 and 44. Portion 44 extends in the axial directions 14 and is in communication with the opposite end surfaces 18 and 22. In the alternative, the portion 44 need not extend to surface 18 and may be in communication only with surface 22 at end 20.

Channel portion 42 extends transverse to channel portion 44 and preferably at a right angle thereto forming an L-shaped channel as seen in FIGS. 4 and 10. The portion 42 extends from and in communication with channel portion 44 a distance to fully receive the circular cylindrical projection 10, FIG. 10. The projection 10 and channel 40 form a bayonet connection for attaching the seal 11 to the pipe 6 end portion 9.

In FIG. 12, the channel 40 including the portions 42 and 44 preferably has a depth d into the bore 12 surface which may be about 1.25 mm in one embodiment. The projection 10, FIG. 8, has a height h preferably about 1 mm to provide a clearance of about 0.25 mm therebetween in this embodiment. The projection has a diameter sized to fit within the channel portion 42 so that it is fully seated into the portion 42 and abuts the portion 42 side wall 47, FIG. 10. No portion of the projection 10 extends into the channel portion 44. Thus the projection 10 and channel portion 42 lock the seal 11 in the axial directions 14 to the pipe portion 9 in combination with the abutment of the seal 11 with the flange 26, FIG. 1. This prevents the seal 11 from accidentally dislodging from the pipe portion 9 during the assembly process at the intermediate assembly point as the assembly moves about in an automotive assembly line prior to the attachment of the remaining components of the exhaust assembly 2, FIG. 1, forming the final assembly.

The seal 11 is axially attached to the pipe 6 portion 9 with the projection 10 and channel portion 44 engaged. When the projection 10 is aligned with the channel portion 42, the seal is twisted or rotated on the pipe 6 engaging the projection 10 with the channel portion 42 axially securing the seal to the pipe 6 and flange 26. The 0.25 clearance between the seal channel portion 42 and the projection 10 permits a latitude of dimensional variations between the components to permit the seal to remain locked to the pipe 6 regardless of the clearance between the pipe 6 OD and seal bore internal diameter (ID). The bayonet fit secures the seal even in the presence of a loose tolerance between the seal bore and pipe OD surfaces. A tighter fit between the two surfaces also permits the two components to be assembled by normal work rule manual pushing forces.

However, to ensure that the projection 10 fits tightly to the channel 40, the channel 40 portions 42 and 44 may have an alternative configuration. As described above, the two channel portions 42 and 44 emanate from the same radii origin O, FIG. 12, and extend in a circumferential direction of radius R2. This origin may also be the origin of the inner surface of the bore 12 or it may be at a different location. In the alternative, the bore 12 surface may be recessed a depth d of a first value in channel portion 44 extending in the axial directions 14 and in the circumferential direction of radius R2. The second channel portion 42 may be inclined relative to the seal inner bore 12 surface in the circumferential direction. The portion 42 may taper on a planar surface in the circumferential direction that is inclined or it may be tapered by a curved surface that emanates from a radius R, FIG. 12, whereas the portion 44 emanates from a radius R2 from a different origin than radius R. The portion 44 may also emanate from a radius R3 shown by dashed lines attached to radius R2 having a different origin than radius R1 forming the radius of the bore 12 surface.

The recessed surface of channel 42 preferably merges smoothly with the surface of the channel portion 44 and may terminate recessed from the bore 12 surface or may terminate flush with the bore 12 surface. By providing a tapered surface to the channel portion 42, the projection 10 when engaged with portion 42 and rotated about axis 15 into abutment with the tapered surface of the channel portion 42, can be readily axially locked in place with minimum manual effort within the guidelines of present automotive assembly lines.

The tapered channel portion provides an interface connection that exhibits a tight fit with the interface connection projection 10 to minimize the occurrence of accidental disengagement during the assembly process. This tight fit occurs regardless of the different tolerances of the channel portion 42 variable depth d and projection 10 fixed height h, FIGS. 8 and 12. In this way different tolerances can be accommodated by the seal and pipe 6. This difference in tolerances does not substantially impact minimizing the disengagement of the seal 11 from the pipe 6 during the assembly line process. Such disengagement might otherwise occur without such a taper even in the presence of a bayonet type connection, but to a significantly lesser degree than with the prior art seals. With a preferred tapered circumferential channel portion 42, the depth of the channel into the bore 12 surface in the circumferential direction about axis 15 varies from a maximum depth value d of portion 44 to a minimum value which may approach zero or be at zero. The taper channel portion 42 thus maximizes the occurrence of a tight fit between the seal and the pipe 6 regardless of dimensional variations of the parts.

The bore 32 of the seal 11 preferably is also formed with optional axially and radially inwardly extending ribs 46, FIGS. 2, 3 and 5. As shown in FIG. 3, there may be three ribs 46 equally spaced about the circumference of the bore 32. The ribs preferably have a height into the bore 32 of about 0.5 to 0.6 mm. These ribs assist in providing additional friction engagement with the pipe 6, FIG. 1, in the presence of dimensional variations of the pipe and seal during manufacture as in the prior art. However, the rib heights do not present a problem of excessive manual pushing force in the presence of the minimum dimensions of the mating parts. The ribs also assist in preventing the seal from rotating in a manner to cause disengagement of projection 10 with the L-shaped channel 40.

Static flange 26, FIGS. 1, 6 and 7, comprises preferably a stamped stainless steel sheet having an annular planar outer washer-like member 28 extending from an inner thicker annular boss 30. The flange 26 has a cylindrical bore 32 for closely receiving pipe 6. The edge of the member 28 at the bore 32 is welded to the pipe 6 at weld 34, FIGS. 1 and 9, to form a gas impervious seal between the member 28 and pipe 6 in a continuous annular seam. The weld 34 fixes the flange 26 axially to pipe 6. The weld is impervious to the hot exhaust gases flowing in the pipe 6.

In the alternative, in an environment where heat is not a factor, other sealing arrangements may be employed for sealing and fixedly securing the pipe 6 to the flange 26. The flange 26 has a pair of oppositely disposed threaded through bores 36. The seal 11 planar surface 18, FIG. 4, abuts the boss 30 planar surface 38 forming a fluid tight seal therewith. Thus the channel 40 in the seal bore 32 abutting the pipe 6 does not negatively impact the sealing action of surface 18 with surface 38 of the flange 26 boss 30. The channel 40 therefore does not affect the integrity of the sealing action of the seal 11.

A second steel flange 48, FIG. 1, has a section 50 having a concave spherical surface that articulates with respect to and movably engages the convex spherical surface 16 of the seal 11. Section 50 extends about and is in sealing mating engagement with seal 11 spherical surface 16. A circular cylindrical pipe section 52 extends axially from the section 50 for receiving pipe 8. Section 52 is welded to the pipe 8 at weld 54 which forms a continuous annular fluid impervious seam about the pipe 8 with the section 52. In the alternative, fixation and sealing of the pipe 8 to the flange 48 may be by other structure for use with lower temperature fluids.

The concave section 50 is connected to circular disc-like flange portion 56. Flange portion 56 extend radially outwardly from section 50 approximately normal thereto at the junction therewith. The flange portion 56 is spaced from the surface 18 of the seal 11 when assembled thereto, FIG. 1. Concave section 50 extends beyond the seal 11 surface 22 when assembled thereto. Flange portion 56 includes a planar ring portion 58 and an outer annular reinforcing rib 60 extending in the axial direction 14' from the outer peripheral edge of the ring portion 58.

Ring portion 58 has a pair of apertures 62 on diametrical opposites sides of the portion 58. Apertures 62 are larger in diameter than the threaded bores 36 in the static flange 26 and are axially aligned with the bores 36 in the assembled state of FIG. 1.

A bolt 64 is in each of the aligned aperture 62 and threaded bore 36 pairs of the respective aligned flanges 26 and 48. Bolt 64 has a head 66 and flange 68 at one end and a threaded stud 70 at its other end which mates with threaded bore 36. A compression coil spring 72 is between the flange 68 and ring portion 58 and receives the respective bolts 64 therethrough. With the bolts in place, the springs 72 are compressed and resiliently urge the flange 48 toward the flange 26. This action urges the flange 48 spherical concave section 50 against the spherical convex seal surface 16 in substantial fluid tight, but dynamic relation. This action also seats the seal 11 planar surface 18 in fluid tight static relation with the flange 26 surface 38. The wedge shape of the seal engaged with the flange 48 section 50 forces the seal 11 convex surface against section 50 and thus the seal 11 bore 32 against the pipe 6 outer surface creating a good fluid tight seal between the seal 11 convex surface 16 and the section 50 concave surface.

The seal 11 is thus axially locked between the pipe 6 and the flanges 26 and 48. The seal 11 is in static relation to the flanges 26, 48 and pipe 6.

The bolts 64 have a diameter smaller than apertures 58 so as to float transversely in these apertures. This floating action permits the flange 48 to rotate in response to rotation of the pipe 8 relative to pipe 6 with three degrees of rotation freedom and no translation.

In operation, the exhaust gas flows through the pipes 6 and 8 and the junction 66 therebetween. The resilient axial load of the springs 72 forces the seal 11 generally in axial direction 14" squeezing the seal between and against the flanges 26 and 48. The gas can not flow between the pipe 8 and flange 48 to the ambient atmosphere because of the weld 54. Similarly the gas can not flow between flange 26 and the pipe 6 to the ambient atmosphere because of weld 34.

The gas may follow a path between the seal 11 bore 32 surface and pipe 6 to the interface between seal 11 planar surface 18. However, because the seal 11 surface 18 is in sealing engagement with the flange 26 surface 38, the leakage therebetween is minimized.

A second path for the hot gases may be between the convex spherical seal surface 16 and the concave flange section 50. This too is a relatively fluid tight seal and minimizes gas leakage. Therefore, gas leakage is substantially precluded by the sealing surfaces of the seal 11.

Figure 13:
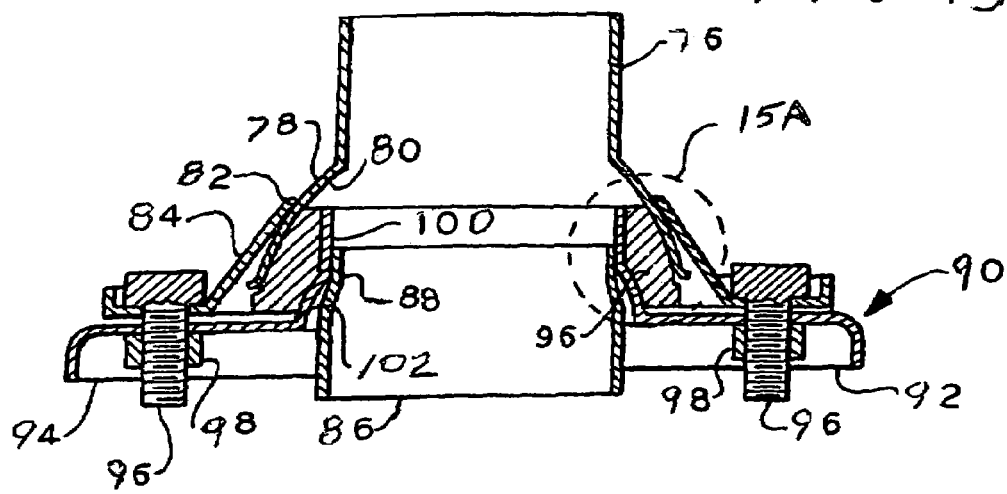
FIG. 13 is a sectional elevation view of a joint and seal according to a further embodiment.
Figure 14:
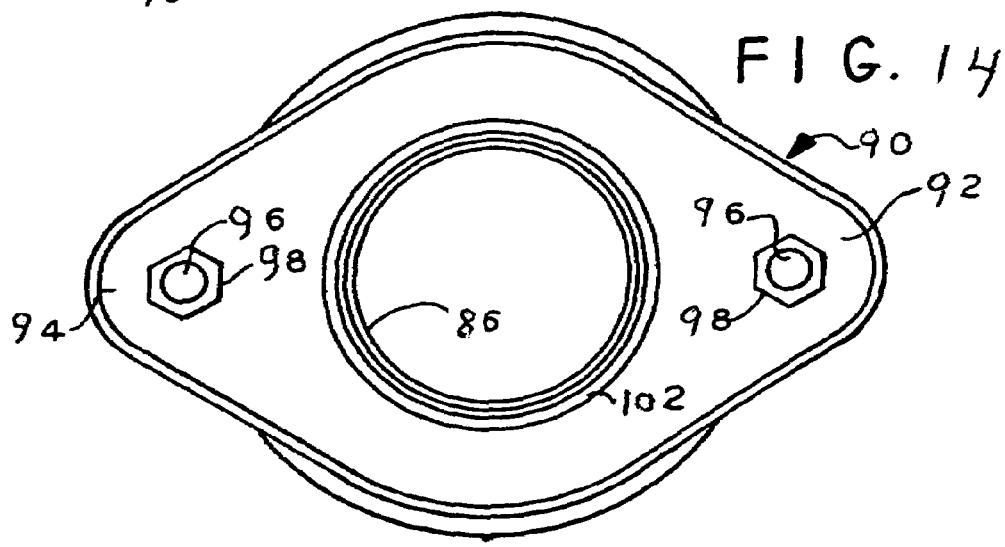
FIG. 14 is a bottom plan view of the joint of FIG. 13.
Figure 15:
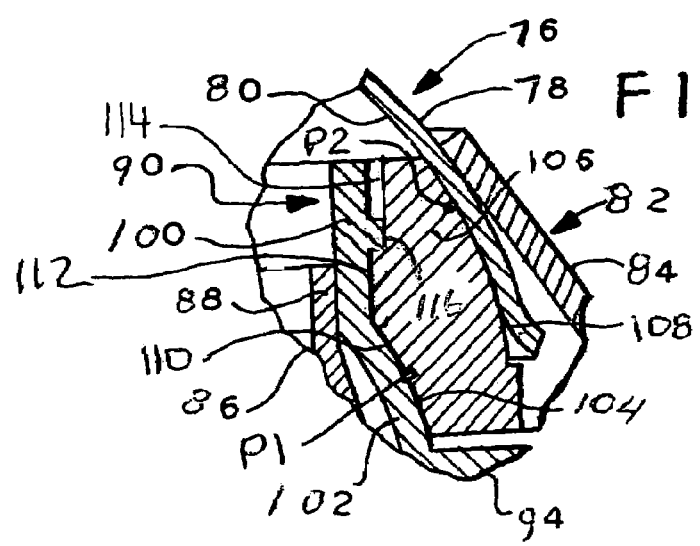
FIG. 15 is a more detailed view of the joint of FIG. 13 taken at region 15.

FIGS. 13, 14 and 15 illustrate a seal 106 according to a further embodiment wherein the seal is for a static pipe joint. Pipe 76, which may be stainless steel, has an annular spherical segment 78. Segment 78 has an annular concave spherical surface 80. A flange 82 has a conical portion 84 welded to the exterior surface of the segment 78 in a gas tight annular seam.

Pipe 86, which may be stainless steel, is axially aligned to and rigidly fixed relative to pipe 76. Pipe 76 has an annular segment 88. Lower flange 90 has mirror image generally triangular shaped members 92 and 94. Flange 90 is secured rigidly fixed to flange 82 by bolts 96 and nuts 98. Flange 90 has a circular cylindrical segment 100 welded to the pipe 86 forming a gas tight annular seam. The flanges 82 and 90 are preferably stamped sheet steel.

The flange 90 has a spherical segment 102 having a convex annular spherical surface 104. Segment 102 terminates at members 92 and 44. Seal 106 is disposed between pipe 76 spherical segment 78 and flange 90 segments 100 and 1022. The seal 106 is made as discussed above in connection with seal 11. Seal 106 may be identical to seal 11. The pipe 76 at the mating concave surface 80 and seal 106 outer spherical surface 108 have different radii. The seal 106 concave surface 110 which mates with the convex surface 104 of the flange segment 102 have different radii. These different radii at the mating surfaces produce annular stress concentration or pressure points P1 and P2 between the seal 96 with the mating surfaces of the flanges due to the different radii of the mating convex and concave surfaces. This is discussed in more detail in the aforementioned U.S. Pat. No. 6,312,022 incorporated by reference herein. Pipe 76 is fixed relative to pipe 86 in FIG. 13, whereas the pipe 8 is in dynamic relation relative to the pipe 6, FIGS. 1–3. Gas leakage is precluded or minimized by the sealing action between seal 1066 and pipe 76 and by the weld between flange 90 and pipe 86 and the sealing action between the seal 106 and flange 90. Thus all paths of the flowing gas are sealed.

The seal 106 has channels (not shown) in the seal 106 bore which receives pipe 86 cylindrical segment 100. A projection (not shown) on the pipe segment 100 outer peripheral surface mates with these channels in the manner discussed above in connection with the embodiments of FIGS. 1–12.

FIGS. 13, 14 and 15 illustrate a seal according to a further embodiment wherein the seal is for a static pipe joint. Pipe 76, which may be stainless steel, has an annular spherical segment 78. Segment 78 has an annular concave spherical surface 80. A flange 82 has a conical portion 84 welded to the exterior surface of the segment 78 in a gas tight annular seam.

Pipe 86, which may be stainless steel, is axially aligned to and rigidly fixed relative to pipe 76. Pipe 76 has an annular segment 88. Lower flange 90 has mirror image generally triangular shaped members 92 and 94. Flange 90 is secured rigidly fixed to flange 92 by bolts 96 and nuts 98. Flange 90 has a circular cylindrical segment 100 welded to the pipe 86 forming a gas tight annular seam. The flanges 82 and 90 are preferably stamped sheet steel. The flange segment 100 outer surface is received in and mates with the seal 106 bore 112. The seal bore 112 has a channel 114 corresponding to channel 40, FIG. 10, with channel portions corresponding to channel portions 42 and 44. The flange 94, has a projection 116 on the outer peripheral surface extending radially outwardly in engagement with the channel 114 in the seal 106 bore 112.

The flange 90 has a spherical segment 102 having a convex annular spherical surface 104. Segment 102 terminates at members 92 and 94. Seal 106 is disposed between pipe 76 spherical segment 78 and flange 90 segments 100 and 102. The mating spherical surfaces of the spherical segments 78 and 102 have the same radii relationship as the corresponding segment surfaces of the seals described in U.S. Pat. No. 6,312,022, incorporated by reference herein in its entirety, for the embodiment of FIGS. 1–3 in connection with FIGS. 7–9 of that patent. The mating surfaces 80 and 108 have different radii and the mating surfaces 104 and 110 have different radii. As a result, there are annular stress concentration or pressure points P1 and P2, FIG. 15, due to the different radii of the mating convex and concave surfaces of the corresponding mating spherical segments of the pipe 76, seal 106 and flange 90 segment 102. The pipe 76 is rigidly fixed in place relative to pipe 86 in FIGS. 13–15, whereas the pipe 8 is in dynamic relation relative to the pipe 6, FIGS. 1–3. Gas leakage is precluded or minimized by the sealing action between seal 106 and pipe 76 and by the weld between flange 90 and pipe 86 and the sealing action between the seal 106 and flange 90. Thus all paths of the flowing gas are sealed. In this embodiment, the pipe segment 100, FIG. 13, has a radially outwardly extending projection (not shown) that mates with a corresponding channel portions (not shown) corresponding to the projection 10 and channel portions 42 and 44 in the embodiment of FIG. 9.

In FIGS. 16 and 18, an alternative embodiment of a seal comprises seal 118 having a bore 119. Four L-shaped channels 120, 122, 124 and 126 are formed in the inner surface of the bore 119 and having the shape of channel 40, FIG. 10. These channels are arranged to receive a projection on the mating pipe outer surface such as projection 10, FIGS. 6–10, on pipe 6. Also, such four channels may be formed in the seal 106, FIG. 13, and receive the projection 116. In this embodiment, it is easier to assemble the seal as there are four possible channels to insert the projection on the mating structure, thus requiring less time for orientation and alignment of the channel to the projection. The channels in a seal such as channels 120, 122, 124 and 126 may be identical.

In a further embodiment in FIG. 17, seal 128 has an L-shaped channel 130. Channel 130 has a longitudinal portion 132 that does not extend to opposite ends of the seal as does channel 40 portion 44, FIG. 10. The transverse channel portion 134 is medially the seal end edges 136, 138.

In FIG. 19, a further embodiment includes a seal 139 having a channel 140. The channel 140 has a longitudinal portion 141 and a transverse portion 142. Transverse portion 142 is inclined preferably about 45° relative to the longitudinal axis 143 of portion 141 and terminates at edge 145. When the seal is rotated to secure a projection thereto, the projection when it mates in the inclined portion 142 cams the seal in direction 144 to further lock the seal to the mating pipe or flange carrying the projection. Of course, more than one such channel and more than one such projection may be provided as discussed above. In this case the seal must be displaced axially in two opposite directions and rotationally to dislodge it from the projection making the seal attachment more secure to the mating structure. That is, the seal 139 must be rotated and axially displaced to dislodge the projection from the channel portion 142 and then must be axially displaced to dislodge it from the channel portion 141.

In FIG. 20, pipe 145 has an outer cylindrical surface 146 from which projects radially outwardly two diametrically opposite projections. 147, each of which is circular cylindrical as are all projections depicted herein. However such projections may be oriented at any relative angular relation therebetween. For example, in FIG. 21, pipe 148 has projections 149 spaced apart at 120°.

Also, as an additional advantage, the projection and mating channels preclude relative rotation of the seal to the pipes and flanges in the joint during use as an automotive exhaust joint. This lack of relative rotation minimizes wear of the seal due to friction occurring during such relative rotation.

Thus there has been shown a seal wherein a bayonet type fitting is provided as an interface connection between the seal and a mating pipe circular cylindrical construction such as pipe 6, FIG. 1, or flange such as flange 90 attached to a pipe such as pipe 86, FIG. 15, and which connection minimizes possible disengagement of the seal 11 from the pipe 6 or seal 106 from the flange 90 during intermediate assembly line processing of the assembly and which also precluded relative rotation therebetween during use.

While the channel portion 42 is normal to the axial direction of the channel portion 44 in the preferred embodiment of FIG. 10, the angular relation between the two channel portions may be different than normal as shown in FIG. 19. This is also shown in FIG. 10 where the channel portion 42 side wall 47 may be inclined relative to the channel portion 44 axial direction toward the surface 18 of the seal 11 as shown by the dashed line 74. In this case, the side wall 47 junction with the channel 44 side wall 76 is positioned axially more toward surface 22 than when the side wall 47 is normal to the axis 15 (FIG. 9). The junction between walls 47 and 76 prevents the projection 10 from moving purely in rotation in the reverse direction into engagement with the channel portion 44. Disengagement of the seal from the pipe 6 also requires axial displacement of the seal in a direction toward the surface 22. This is because the projection is seated against the wall 47 at a point that is closer to surface 18 than that junction.

Figure 22:
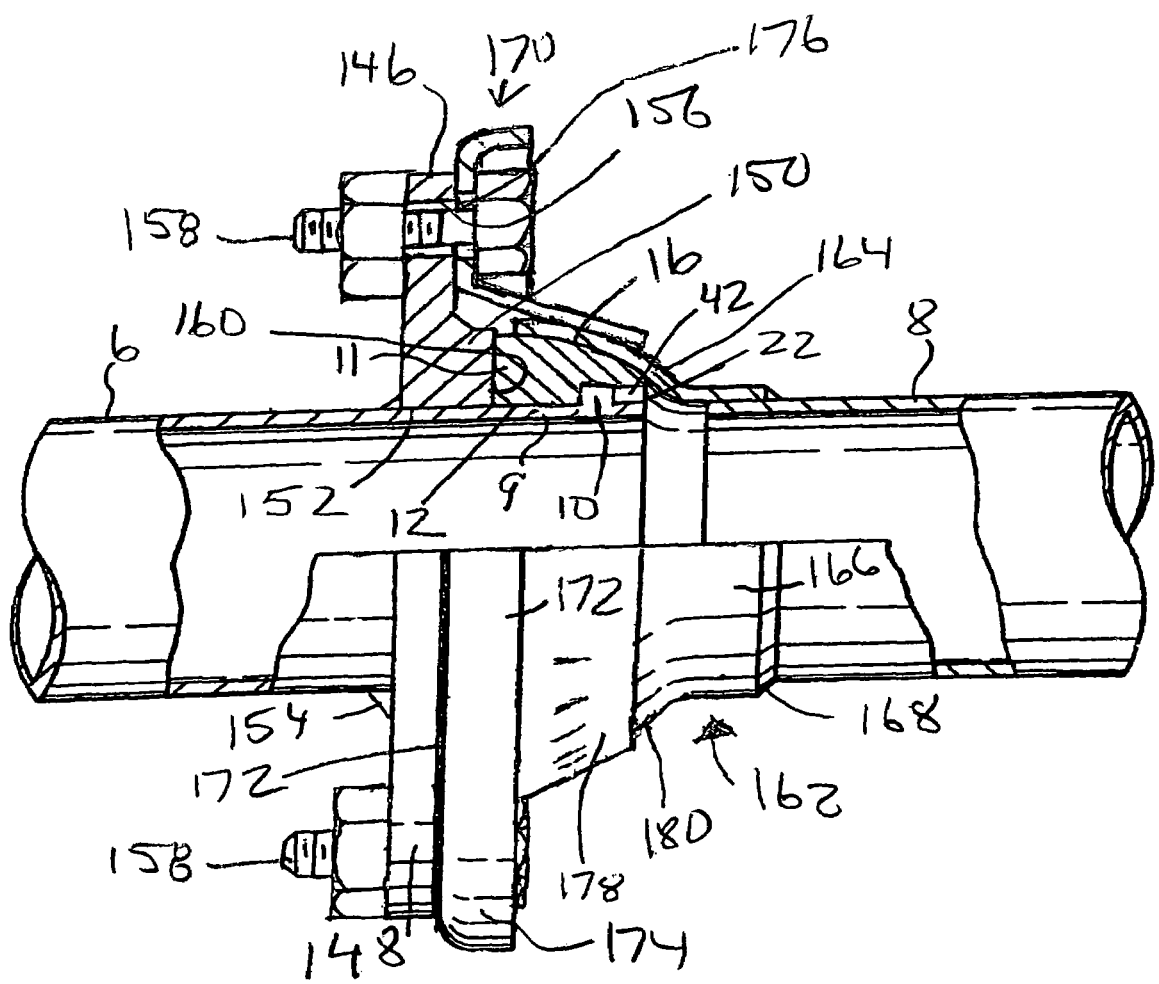
FIG. 22 is a side elevation sectional view, partially in section, of an exhaust joint and seal according to a further embodiment of the present invention.

In FIG. 22, parts with identical reference numerals to other parts in the other figures are identical to such other parts. Static flange 146 comprises preferably a stamped stainless steel sheet having an annular planar outer washer-like member 148 extending from an inner thicker annular boss 150. The flange 146 has a cylindrical bore 152 for closely receiving pipe 6. The edge of the member 148 at the bore 152 is welded to the pipe 6 at weld 154 to form a gas impervious seal between the member 148 and pipe 6 in a continuous annular seam. The weld 154 fixes the flange 146 axially to pipe 6. The weld is impervious to the hot exhaust gases flowing in the pipe 6.

The flange 146 has a pair of oppositely disposed through bores 156 for receiving bolts 158. The seal 11 planar surface 18, FIG. 4, abuts the boss 150 planar surface 160 forming a fluid tight seal therewith. Thus the channel 40 in the seal bore 12 abutting the pipe 6 does not negatively impact the sealing action of surface 18 with surface 150 of the flange 146 boss 150. The channel 40 therefore does not affect the integrity of the sealing action of the seal 11.

A second stamped stainless steel flange 162 has a section 164, which has a concave spherical surface that abuts the convex spherical surface 16 of the seal 11 in fixed mating sealing relationship. Section 164 extends about and is in sealing mating engagement with a major portion of the seal 11 spherical surface 16. A circular cylindrical pipe section 166 extends axially from the section 164 for receiving pipe 8. Section 166 is welded to the pipe 8 at weld 168 which forms a continuous annular fluid impervious seam about the pipe 8 with the section 166. In the alternative, fixation and sealing of the pipe 8 to the flange 162 may be by other structure for use with lower temperature fluids.

Flange 170 has an annular washer-like flange portion 172, which abuts flange 146 and extends radially inwardly from outer lip 174. Flange portion 172 has a pair of bores 176 on diametrical opposites sides. Bores 176 and bores 156 are axially aligned for receiving the bolts 158, which secure the flanges 146 and 170 together in fixed relation.

Flange 170, which is stamped sheet steel, also includes a frusto-conical section 178 which overlies and abuts the outer spherical surface 180 of the flange 162 spherical section 164 in a ring contact region. The section 178 is welded to the outer surface 180 of the stamped steel flange 162 in an annular weld at the contact region. The resulting joint is fluid tight as a result of the welds and mating surfaces of the seal 11 with the flanges.

The bolts also seat the seal 11 planar surface 18 (FIG. 4) in fluid tight static relation with the flange 146 surface 160.

It will occur to one of ordinary skill that modifications may be made to the disclosed embodiments. While the seals are preferably formed of knitted wire mesh, they may be formed as solid metal structures, e.g., powdered composite without a mesh reinforcement. Also, the seal may be forged, machined, cast or otherwise formed. The mesh may or may not be knitted. The reinforcement may be made of non-metallic materials. It is intended that the scope of the invention be defined by the appended claims, the description herein being given by way of illustration and not limitation.

What is claimed is:

1. A seal construction for an automotive exhaust system joint defining an interface, the joint including first and second exhaust pipes each having an outer cylindrical surface, the joint further including first and second flanges attached to the respective pipes for interconnecting the pipes at the joint in a final assembly, at least the first flange having an outer cylindrical surface, one of the first flange outer cylindrical surface or first or second pipe outer cylindrical surface having a first interface connection, the seal construction comprising:

an annular seal with a cylindrical bore defining an axis and formed of at least one heat resistant filament for location in the interface for sealing the joint at the interface so that fluid flows between the pipes with negligible exhaust leakage;

the seal having a second interface connection in the bore dimensioned to be movably and releasably connected to and disconnected from the first interface connection in a direction generally defined by said axis without modification of either interface connection, the first and second interface connections being arranged to preclude relative rotation of the seal to the flanges and pipes and to minimize vibratory disengagement of the seal from the one pipe or flange in an intermediate assembly prior to final assembly of the pipes and flanges.

2. The seal construction of claim 1 wherein the seal has an outer surface and the bore is circular cylindrical having a first surface defining a longitudinal axis, the first surface having the second interface connection, the first surface for mating with and receiving the one of the first flange outer cylindrical surface or first or second pipe outer cylindrical surface.

3. The seal construction of claim 1 wherein the first interface connection comprises a projection extending radially outwardly from the one of the first flange outer cylindrical surface or first or second pipe outer cylindrical surface, the bore having opposing ends and a first surface, the second interface connection comprising a channel defined by first and second portions in said bore first surface, the first channel portion extending in an axial direction along an axis and in communication with at least the bore first end and a second channel portion in communication with the first channel portion in a region at least medially the first and second ends and extending in a direction transverse to the first channel portion axial direction, the first and second channel portions for sequentially receiving the projection for axially and rotationally securing the seal to the one flange, to the first pipe or to the second pipe with said projection.

4. The seal construction of claim 3 wherein the second channel portion extends in a circumferential direction that is normal to the first channel portion longitudinal direction.

5. The seal construction of claim 3 wherein the first channel portion is defined by a second surface recessed into the first surface, the second channel portion defined by a recessed third surface that tapers from the second surface toward the first surface.

6. The seal construction of claim 5 wherein the tapering third surface merges with the first surface and second surface.

7. The seal construction of claim 5 wherein the projection extends from the one of the first flange outer cylindrical surface or first or second pipe outer cylindrical surface having the first interface connection a distance less than the depth of at least the first channel portion.

8. The seal construction of claim 3 wherein the seal has an outer spherical surface, the first flange being secured to the first pipe and abuts the seal at the seal first end and the second flange is movably secured to the first flange and abutting the spherical surface, the second flange being arranged to receive the second pipe.

9. The seal construction of claim 3 wherein the first channel portion is defined by a second surface recessed into the first surface, the second channel portion defined by a third surface recessed from the first surface, the second and third recesses being defined by radii having a common origin.

10. The seal of claim 3 wherein the first channel portion is defined by a second surface recessed into the first surface, the second channel portion defined by a third surface recessed from the first surface, the second and third recesses defined by radii having different origins.

11. The seal construction of claim 10 wherein the third surface merges gradually with the first and second surfaces to form a smooth transition therebetween.

12. The seal construction of claim 3 wherein the first channel portion is defined by a second surface recessed into the first surface, the second channel portion defined by a third surface recessed from the first surface, the third surface being inclined relative to the first and second surfaces.

13. The seal construction of claim 3 wherein the projection has a height of about 1 mm and the first channel has a depth of about 1.25 mm.

14. The seal construction of claim 13 wherein the second channel has a depth that varies in the range of about 1.25 mm to zero.

15. The seal construction of claim 3 wherein the second channel portion extends in a circumferential direction relative to the first channel portion.

16. The seal construction of claim 3 wherein the inner bore includes a plurality of said first and second channel portions.

17. The seal of claim 16 wherein the at least one projection includes a plurality of projections, at least a portion of said plurality of said first and second channel portions for simultaneous engagement with said plurality of projections.

18. The seal of claim 3 wherein the second channel portion extends in a circumferential direction that is inclined to the first channel portion longitudinal direction.

19. The seal construction of claim 1 wherein the at least one filament comprises steel wire.

20. The seal construction of claim 1 wherein the at least one filament comprises compressed steel wires.

21. The seal construction of claim 1 wherein the at least one filament is compressed knitted steel wires.

22. The seal of claim 1 wherein the seal is annular with a bore having a first surface for receiving and mating with the outer cylindrical surface of the one of the first flange or first or second pipe, further including a plurality of axially extending spaced ribs extending radially inwardly from the bore first surface dimensioned to frictionally engage the corresponding mating outer cylindrical surface.

23. The seal construction of claim 1 wherein the seal has an outer surface that is spherical and a cylindrical bore with the second interface connection for receiving the outer cylindrical surface having said first interface connection.

24. The seal construction of claim 1 wherein the first and second pipes, first and second flanges and seal include structures for forming one of an articulating joint or a fixed joint relative to each other.

25. The seal of claim 1 wherein the seal has first and second opposing ends, an outer spherical surface and an inner bore with a first surface in communication with said ends, the first flange being secured to the first pipe and for abutting the seal at the seal first end and the second flange for being fixedly secured to the first flange and fixedly secured to the spherical surface, the second flange being arranged to receive the second pipe.

26. An automotive hot gas exhaust seal joint construction comprising:
    a first cylindrical exhaust pipe having first and second opposite end edges;
    a first flange attached to the first cylindrical exhaust pipe, one of the first flange and first pipe having an outer cylindrical surface including at least one projection extending radially outwardly therefrom;
    an annular exhaust gas seal member formed of at least one compressed wire filament, the annular seal member having an outer surface and a circular cylindrical bore with a first surface defining a longitudinal axis, the first surface being engaged with one of the first exhaust pipe and first flange outer cylindrical surface, the cylindrical bore terminating at first and second opposing member ends, said first surface having an axially extending first channel portion, the first channel portion terminating at said first end and terminating at a region that is at least medially the first and second bore ends, said first surface having a second channel portion extending transverse to and in communication with said first channel portion, the first and second channel portions for receiving the at least one projection, said at least one projection engaged with the second channel portion in an engaged seated position; and
    a second flange abutting the member outer surface and attached to the first flange for forming a seal joint with the first flange and member, the second flange for receiving a second pipe.

27. The seal construction of claim 26 wherein the seal outer surface is convex.

28. The seal construction of claim 26 wherein the seal outer surface is spherical.

29. The seal construction of claim 26 wherein the first channel portion is defined by a second surface recessed into the first surface, the second channel portion defined by a recessed third surface that tapers from the second surface toward the first surface.

30. The seal construction of claim 29 wherein the recessed tapered third surface merges with the first surface and second surface.

31. The seal construction of claim 26 wherein the first channel portion is defined by a second surface recessed into the first surface, the second channel portion defined by a third surface recessed from the first surface, the second and third recesses being defined by radii having a common origin.

32. The seal construction of claim 26 wherein the first channel portion is defined by a second surface recessed into the first surface, the second channel portion defined by a third surface recessed from the first surface, the second and third recesses defined by radii having different origins.

33. The seal construction of claim 26 wherein the first channel portion is defined by a second surface recessed into the first surface, the second channel portion defined by a third surface recessed from the first surface, the third surface being inclined relative to the first and second surfaces.

34. The seal construction of claim 33 wherein the third surface merges gradually with the first and second surfaces to form a smooth transition therebetween.

35. The seal construction of claim 26 including a plurality of said first and second channel portions.

36. The seal construction of claim 26 including a plurality of said at least one projection and a plurality of said first and second channel portions, each projection of the plurality for simultaneous engagement with a different first and corresponding second channel portion of the plurality of said first and second channel portions.

37. The seal construction of claim 26 wherein the flanges and pipes are arranged in one of an articulating and fixed joint.

38. A seal joint construction for an automotive exhaust system comprising:
    first and second exhaust pipes having outer cylindrical surfaces each surface defining a first longitudinal axis and a first longitudinal direction;
    first and second flanges attached to the respective first and second pipes for interconnecting the pipes and arranged to form a joint final assembly, at least the first flange having an outer cylindrical surface defining a second longitudinal axis and second longitudinal direction, a pair of surfaces of said pipes and flanges forming an interface;
    a seal in the interface for sealing the joint so that fluid flows between the pipes with negligible exhaust leakage;
    a movable releasable connection between the seal and the outer cylindrical surface of one of said pipes and first flange at said interface dimensioned to permit engagement and disengagement of the seal with respect to the latter outer cylindrical surface without modification of the connection and to preclude relative rotation of the seal to the flanges and pipes and to minimize vibratory disengagement of the seal from the one pipe or first flange in an intermediate assembly of the seal to the one pipe or flange prior to the final assembly.

* * * * *